(12) United States Patent
Deora et al.

(10) Patent No.: US 12,360,890 B2
(45) Date of Patent: Jul. 15, 2025

(54) ZONE-BASED GARBAGE COLLECTION IN ZNS SSDs

(71) Applicant: Western Digital Technologies, Inc., San Jose, CA (US)

(72) Inventors: Aakar Deora, Karnataka (IN); Navin Kochar, Karnataka (IN); Sampath Kumar Raja Murthy, Karnataka (IN); Gursimran Kashyap, Delhi (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/349,088

(22) Filed: Jul. 7, 2023

(65) Prior Publication Data
US 2024/0160562 A1 May 16, 2024

Related U.S. Application Data

(60) Provisional application No. 63/383,232, filed on Nov. 10, 2022.

(51) Int. Cl.
*G06F 12/02* (2006.01)
(52) U.S. Cl.
CPC .................... *G06F 12/0253* (2013.01)
(58) Field of Classification Search
None
See application file for complete search history.

(56) References Cited

U.S. PATENT DOCUMENTS

| | | |
|---|---|---|
| 2014/0095772 A1 | 4/2014 | Lee et al. |
| 2020/0401311 A1 | 12/2020 | Kanno |
| 2022/0075716 A1 | 3/2022 | Tikoo et al. |
| 2022/0171532 A1 | 6/2022 | Kang |
| 2022/0180959 A1 | 6/2022 | Kannan et al. |
| 2022/0244869 A1 | 8/2022 | Kanteti |
| 2022/0318157 A1 | 10/2022 | Hsu et al. |

(Continued)

OTHER PUBLICATIONS

International Search Report and Written Opinion issued in International Application No. PCT/US2023/075885, mailed on Feb. 8, 2024.

(Continued)

*Primary Examiner* — Brian R Peugh
(74) *Attorney, Agent, or Firm* — ARENTFOX SCHIFF LLP

(57) ABSTRACT

Aspects of a storage device are provided including zone-based GC in a ZNS. The storage device includes a NVM and a controller. The NVM includes first blocks, second blocks, and third blocks. The controller creates a first superblock including the first blocks, a second superblock including the second blocks, and a third superblock including the third blocks. The controller allocates a first sub-drive including the first superblock for storing data overwrites and a second sub-drive including the second and third superblocks for storing sequential data in the NVM. During GC for superblocks respectively including data for a specific zone, the controller relocates written data for this zone from the first and third superblocks to the second superblock while refraining from relocating data associated with other zones from the first superblock to the second superblock. As a result, storage device cost, overprovisioning, and WAF may be reduced.

17 Claims, 8 Drawing Sheets

(56) References Cited

U.S. PATENT DOCUMENTS

2022/0350530 A1* 11/2022 Yoshida ................ G06F 3/0644
2022/0382454 A1* 12/2022 Yang ................... G06F 12/0246

OTHER PUBLICATIONS

Reza Salkhordeh et al., "Constant Time Garbage Collection in SSDs", 2021 IEEE International Conference on Networking, Arhitecture and Storage (NAS) 1978-1-7744, 2021. Authorized and licensed to: Visvesvaraya National Institute of Technology. Downloaded on Jun. 3, 2022 at 11:06:29 UTC from IEEE Xplore.
Runnan Shen, et al., "Zone Based Writing Optimization in User Space", 2021 IEEE 23rd Int Conf on High Performance Computing & Communications; 7th Int Conf on Data Science & Systems; 19th Int Conf on Smart City; 7th Int Conf on Dependability in Sensor, Cloud & Big Data Systems & Application. Visvesvaraya National Institute of Technology. Downloaded on Jun. 15, 2022 at 10:29:51 UTC from IEEE Xplore.
Gunhee Choi, et al., "A New LSM-style Garbage Collection Scheme for ZNS SSDs", Dankook University, SK Hynix, 6 pages.
Kyuhwa Han, et al., "ZNS+: Advanced Zoned Namespace Interface for Supporting In-Storage Zone Compaction", 15th USENIX Symposium on Operating Systems Design and Implementation, Jul. 14-16, 2021, 978-1-939133-22-9, pp. 147-162.

\* cited by examiner

ZONE-BASED GARBAGE COLLECTION IN ZNS SSDs

CROSS REFERENCE TO RELATED APPLICATION(S)

This application claims the benefit of U.S. Provisional Application Ser. No. 63/383,232, entitled "ZONE-BASED GARBAGE COLLECTION IN ZNS SSDs" and filed on Nov. 10, 2022, the disclosure of which is expressly incorporated by reference herein in its entirety.

BACKGROUND

Field

This disclosure is generally related to electronic devices and more particularly to storage devices.

INTRODUCTION

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like. Zoned Namespace (ZNS) is an SSD namespace architecture in which a range of logical addresses in the non-volatile memory (e.g. a zoned namespace) is divided into fixed-sized groups of logical addresses, or zones. Each zone within the zoned namespace may be used for a specific application. For example, the host may write data associated with different applications in different zones of the zoned namespace.

SUMMARY

One aspect of a storage device is disclosed herein. The storage device includes a non-volatile memory including a plurality of first blocks and a plurality of second blocks. The storage device further includes a controller that is configured to create a first superblock including the first blocks and a second superblock including the second blocks; and relocate, during garbage collection for a plurality of superblocks including data associated with a first zone, first data associated with the first zone from the first superblock to the second superblock, the first zone including a first range of logical addresses. The controller is further configured to refrain from relocating second data associated with a second zone from the first superblock to the second superblock during the garbage collection, the second zone including a second range of logical addresses different than the first range of logical addresses.

Another aspect of a storage device is disclosed herein. The storage device includes a non-volatile memory including a plurality of first blocks and a plurality of second blocks. The storage device further includes a controller that is configured to create a first superblock including the first blocks and a second superblock including the second blocks; and write first data associated with a first zone to the first superblock and second data associated with a second zone to the first superblock, the first zone including a first range of logical addresses, and the second zone including a second range of logical addresses. The controller is further configured to add the first superblock to a list of superblocks respectively including data associated with the first zone; relocate, during garbage collection for a plurality of superblocks in the list of superblocks, the first data from the first superblock to the second superblock; and refrain from relocating the second data from the first superblock to the second superblock during the garbage collection.

A further aspect of a storage device is disclosed herein. The storage device includes a non-volatile memory including a plurality of first blocks, a plurality of second blocks, and a plurality of third blocks. The storage device further includes a controller that is configured to create a first superblock including the first blocks, a second superblock including the second blocks, and a third superblock including the third blocks; and allocate a first sub-drive and a second sub-drive in the non-volatile memory, the first sub-drive including a first plurality of superblocks for storing data overwrites and the second sub-drive including a second plurality of superblocks for storing sequential data. The first plurality of superblocks includes the first superblock, and the second plurality of superblocks includes the second superblock and the third superblock. The controller is further configured to write first data associated with a first zone to the first superblock, second data associated with a second zone to the first superblock, and third data associated with the first zone to the third superblock, the first zone including a first range of logical addresses, and the second zone including a second range of logical addresses. The controller is also configured to relocate, during garbage collection for a plurality of superblocks respectively including data associated with the first zone, the first data from the first superblock and the third data from the third superblock to the second superblock; and refrain from relocating the second data associated with the second zone from the first superblock to the second superblock during the garbage collection. It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
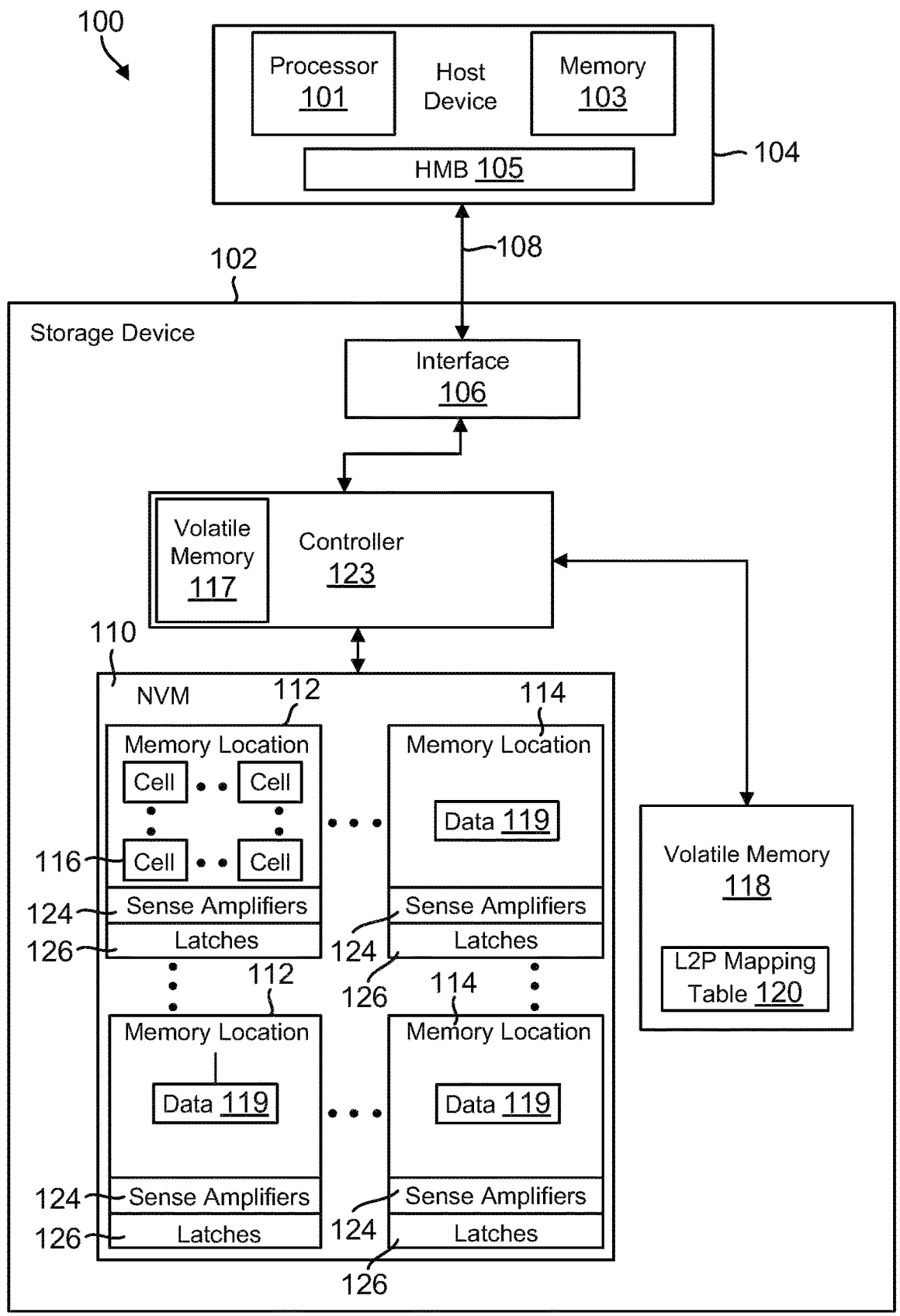
FIG. 1 is a block diagram illustrating an exemplary embodiment of a storage device in communication with a host device.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

In zoned namespace (ZNS) architectures, a flash storage device may determine a definition of zones, or groups of logical addresses, for data storage. For example, the flash storage device may determine that one group of logical pages, or one logical block, is associated with a first zone, that another group of logical pages, or another logical block, is associated with a second zone, and so forth. The flash storage device may then map each logical block to one or more physical blocks in the flash memory. For instance, the flash storage device may map the logical pages associated with the first zone to physical pages in a first group of physical blocks, the logical pages associated with the second zone to physical pages in a second group of physical blocks, etc. The flash storage device may maintain these mappings of logical pages to physical pages in flash memory in a logical-to-physical (L2P) mapping table in volatile memory (e.g., dynamic random access memory (DRAM) or static random access memory (SRAM)).

In ZNS, host data is strictly written sequentially to a zone. For example, whenever the host issues a zone write command in which it sends the flash storage device a logical page of data to be written to flash memory at a given logical address, the flash storage device moves a write pointer to the next logical address in the zone, and the host is expected to send data for that next logical page when issuing a subsequent zone write command. If the host does not follow this sequence (e.g., if the next write command from the host includes a logical address which is out of order in the sequence, such as a same logical address in an attempted data overwrite), the flash storage device may issue an error and abort the zone write. As a result, a host generally may not overwrite data at a given logical address in a zone until after the zone is fully written.

However, ZNS may be extended to support data overwrites in a zone within a zone random write area (ZRWA) associated with that zone. For instance, the host may send a zone open command to open a zone in a ZRWA mode, and this mode may remain associated with the zone until the zone is finished. For a zone opened in a ZRWA mode, the flash storage device may define a predefined region size (e.g., 1 MB) including a sub-range of logical addresses in the zone which the flash storage device may expose to a host for overwrites. In response to a commit operation from either the host or the flash storage device, the flash storage device may move this predefined region size (a ZRWA window) to a next sub-range of logical addresses in the zone.

The flash storage device may create superblocks respectively from groups or combinations of erase blocks within non-volatile memory. These superblocks are configured to be exactly of the same size as a zone. For example, if a zone size includes a number X MB s of data, then a superblock may similarly store only X MB s of data. However, when data overwrites occur as in a ZRWA mode, the host may have written more than X MB s in a given zone, which additional data may not be stored in the superblock. As a result, the flash storage device may write the data into a different superblock in the non-volatile memory.

As an example, when the host issues a zone write command including a logical page of sequential or random data to a zone supporting a ZRWA, the flash storage device may initially store that logical page in a superblock allocated for initial writes to that zone in non-volatile memory, and the flash storage device may move a write pointer to the next logical address in the zone within the ZRWA window. The flash storage device may also create an associated L2P entry for that initially written zone data in the L2P mapping table. If the host issues a zone write command indicating a same logical address as a previously issued zone write command (e.g., a data overwrite) within the ZRWA window, then rather than aborting the write command as previously described, the flash storage device may store that next logical page in a default superblock allocated for overwrites to multiple zones in non-volatile memory. For example, although most of the host data written to a zone is sequential in nature, a small percentage of host writes (e.g., 2%-5% of host writes) may be random in nature, and so the host may issue a zone write command including such random data to overwrite previously written sequential data. As a result, this default superblock in non-volatile memory may fill up over time with data overwrites in multiple zones.

To reclaim this memory used for overwrites by a respective zone, a controller of the flash storage device may apply a zone-based garbage collection process, referred to throughout this disclosure as a "GC sweep". The controller may trigger the GC sweep in response to determining that a certain number of overwrites has occurred to the default superblock (e.g., the superblock allocated for overwrites to multiple zones in non-volatile memory), for example, if more than 2-3% of the memory capacity of the flash storage device includes data overwrites to one or more zones. During a GC sweep, the controller may recycle respective zone data from that default superblock to an allocated superblock for a respective zone. For instance, the controller may perform a compaction or garbage collection process which allows valid (e.g., initially written) zone data in one superblock with overwritten zone data in the default superblock to be consolidated together into a single superblock. The controller may perform this GC sweep for multiple zones, thereby achieving compaction of valid zone data in allocated superblocks for respective zones. As a result of the zone-based garbage collection, the write amplification factor (WAF) of the flash storage device may be reduced.

In one example of this zone-based garbage collection or GC sweep, the controller of the flash storage device initially selects a zone which was overwritten and includes data to be recycled back into a single superblock, and the controller identifies the logical range for that zone. Using hardware accelerators in the controller (one of which may be a data processor), the controller fetches the L2P entries including the physical addresses of that logical range of that zone from an L2P mapping table which stores logical to physical addresses of the zone data. From this mapping table, the controller may fetch all of the physical addresses in non-volatile memory where the zone's data resides. Afterwards, the controller maps those physical addresses to their containing superblocks. For example, the controller may have grouped combinations of erase blocks into respective superblocks, and so the controller may identify the superblocks associated with those physical addresses. Once the controller has identified those superblocks, the controller recycles the zone data from those superblocks to a particular, empty destination superblock. The controller recycles the superblocks on an individual basis.

During the recycling process, the flash storage device may utilize a recycle reader module and a recycle writer module of the controller. The empty destination superblock where the controller intends to consolidate the data may be assigned to the recycle writer module, and the list of superblocks the controller has identified which contains the zone's data may be assigned to the recycle reader module. The recycle reader module processes the list of superblocks, one superblock at a time. When the recycle reader module processes a given superblock (the source superblock), the recycle reader module reads a manifest inside the superblock which provides information about what data is written where in the superblock. Using the manifest, the controller may filter out the zone's data in that superblock. Once the controller identifies that part in the whole superblock where the particular zone's data of interest is residing, the controller reads out that particular data and the recycle writer module writes that data into the destination superblock. This exercise may occur for all the source superblocks which are in the list that the controller identified, and continues until the list of source superblocks is fully processed (exhausted). At the end, a destination superblock is compacted with the zone's data. By this time, the zone's data is no longer split among different superblocks, but has been consolidated into a single superblock. Thus, as a result of the garbage collection process, the zone data is effectively swept out of multiple superblocks and placed it into one superblock for that respective zone.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host 104 may also include a host memory buffer (HMB 105). The HMB 105 is a portion of host memory (e.g., host memory 103 or a different memory in host 104) that the host 104 may allocate to the storage device 102 to utilize for the storage device's own purposes. For instance, the storage device 102 may utilize the HMB 105 as an address mapping table cache or a data cache. In some examples, the HMB 105 may include volatile memory, such as RAM, DRAM, or SDRAM (e.g., DDR1, DDR2, DDR3, DDR3L, LPDDR3, DDR4, and the like). In other examples, the HMB 105 may include non-volatile memory.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, Hiper-LAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

The storage device 102 includes a memory. For example, in the exemplary embodiment of FIG. 1, the storage device 102 may include a non-volatile memory (NVM) 110 for persistent storage of data received from the host 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of NVM memory locations 112 which may store system data for operating the storage device 102 or user data received from the host for storage in the storage device 102. For example, the NVM may have a cross-point architecture including a 2-D NAND array of NVM memory locations 112 having n rows and m columns, where m and n are predefined according to the size of the NVM. In the exemplary embodiment of FIG. 1, each NVM memory location 112 may be a die 114 including multiple planes each including multiple blocks of multiple cells 116. Alternatively, each NVM memory location 112 may be a plane including multiple blocks of the cells 116. The cells 116 may be single-level cells, multi-level cells, triple-level cells, quad-level cells, and/or penta-level cells, for example. Other examples of NVM memory locations 112 are possible; for instance, each NVM memory location may be a block or group of blocks. Each NVM memory location may include one or more blocks in a 3-D NAND array. Each NVM memory location 112 may include one or more logical blocks which are mapped to one or more physical blocks. Alternatively, the memory and each NVM memory location may be implemented in other ways known to those skilled in the art.

The storage device 102 also includes one or more volatile memories 117, 118 that can, for example, include a Dynamic Random Access Memory (DRAM) or a Static Random Access Memory (SRAM). For example, as illustrated in FIG. 1, volatile memory 117 may be an SRAM internal to (or integrated into) controller 123 of the storage device 102, while volatile memory 118 may be a DRAM external to (or remote from) controller 123 of the storage device 102. However, in other examples, volatile memory 117 may be a DRAM external to controller 123 and volatile memory 118 may be an SRAM internal to controller 123, volatile memory 117, 118 may both be internal to controller 123 or both be external to controller 123, or alternatively, storage device 102 may include only one of volatile memory 117, 118. Data stored in volatile memory 117, 118 can include data read from the NVM 110 or data to be written to the NVM 110. In this regard, the volatile memory 117, 118 can include a write buffer or a read buffer for temporarily storing data.

The memory (e.g. NVM 110) is configured to store data 119 received from the host device 104. The data 119 may be stored in the cells 116 of any of the NVM memory locations 112. As an example, FIG. 1 illustrates data 119 being stored in different NVM memory locations 112, although the data may be stored in the same NVM memory location. In another example, the NVM memory locations 112 may be different dies, and the data may be stored in one or more of the different dies.

Figure 2:
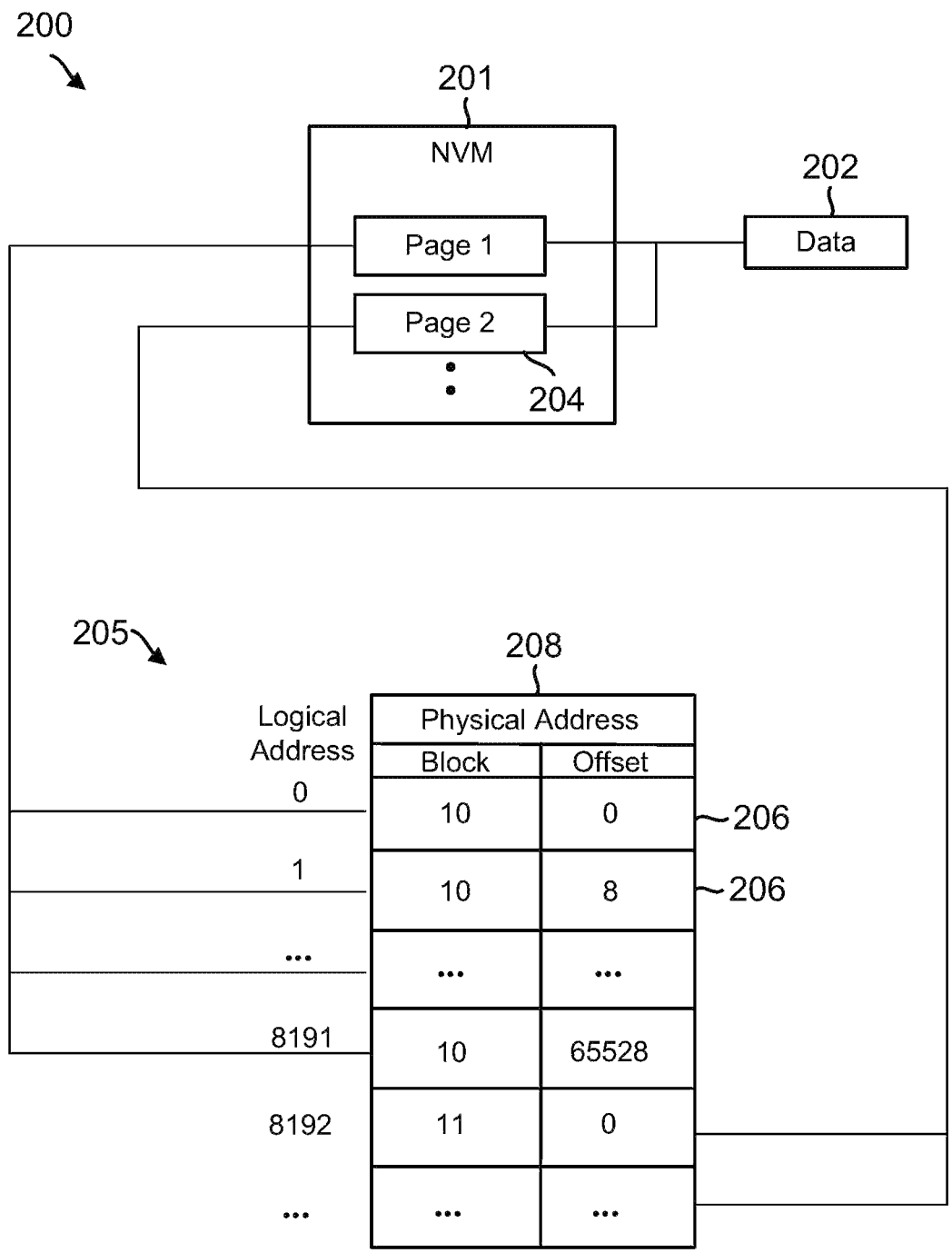
FIG. 2 is a conceptual diagram illustrating an example of a logical-to-physical mapping table in a non-volatile memory of the storage device of FIG. 1.

Each of the data 119 may be associated with a logical address. For example, the volatile memory 118 may store a logical-to-physical (L2P) mapping table 120 for the storage device 102 associating each data 119 with a logical address. The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a physical address associated with each memory location 112 in the NVM where data is stored. While FIG. 1 illustrates a single L2P mapping table 120 stored in volatile memory 118, in other examples, the L2P mapping table 120 may include multiple tables stored in volatile memory 118. Mappings may be updated in the L2P mapping table 120 respectively in response to host writes, and periodically the L2P mapping table 120 may be flushed from volatile memory 118 to one or more of the NVM memory locations 112 of NVM 110 so that the mappings may persist across power cycles. In the event of a power failure in storage device 102, the L2P mapping table 120 in volatile memory 118 may be recovered during initialization from the L2P entries previously stored in NVM 110. FIG. 2 is a conceptual diagram 200 of an example of an L2P mapping table 205 stored in volatile memory (e.g., the volatile memory 118 of FIG. 1) illustrating the mapping of data 202 received from a host device to logical addresses and physical addresses in NVM 201 (e.g., the NVM 110 of FIG. 1). The data 202 may correspond to the data 119 in FIG. 1, while the L2P mapping table 205 may correspond to the L2P mapping table 120 in FIG. 1. In one example, the data 202 may be stored in one or more pages 204 (e.g., physical pages) in NVM 201. Each page 204 may be associated with a mapping set including one or more entries 206 of the L2P mapping table 205 respectively identifying a physical address 208 mapped to a logical address (e.g., a logical block address (LBA)) associated with the data written to the NVM. A logical page may include one or more of the entries 206. An LBA may be a logical address specified in a write command for the data received from the host device. Physical address 208 may indicate the block and the offset at which the data associated with an LBA is physically written, as well as a length or size of the written data (e.g. 4 KB or some other size). In the illustrated example, page 204 encompassing 32 KB of data 202 may be associated with a mapping set including 8192, 4 KB entries. However, in other examples, page 204 may encompass a different amount of host data (e.g. other than 32 KB of host data) or may include a different number of entries 206 (e.g., other than 8192 entries), or entries 206 may respectively include different host data lengths (e.g., other than 4 KB each).

Referring back to FIG. 1, the NVM 110 includes sense amplifiers 124 and data latches 126 connected to each NVM memory location 112. For example, the NVM memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the NVM memory location 112, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the NVM memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), a system on a chip (SoC), a Field Programmable Gate Array (FPGA), hard-wired logic, analog circuitry and/or a combination thereof.

The controller 123 is configured to receive data transferred from one or more of the cells 116 of the various NVM memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the volatile memory 118 when reading or writing data to the cells 116. For example, the controller 123 may receive logical-to-physical address mappings from the volatile memory 118 in response to read or write commands from the host device 104, identify the physical addresses mapped to the logical addresses identified in the commands (e.g. translate the logical addresses into physical addresses), and access or store data in the cells 116 located at the mapped physical addresses. The controller 123 is also configured to access the L2P mapping table 120 in the NVM 110, for example, following a power failure during initialization, to recover or populate the L2P mapping table 120 in the volatile memory 118.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The interface element 106 receives the write command, and the controller allocates a NVM memory location 112 in the NVM 110 of storage device 102 for storing the data. The controller 123 stores the L2P mapping in the L2P mapping table 120 to map a logical address associated with the data to the physical address of the NVM memory location 112 allocated for the data. The controller 123 then stores the data in the NVM memory location 112 by sending it to one or more data latches 126 connected to the allocated NVM memory location, from which the data is programmed to the cells 116.

The host 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the L2P mapping table 120 to translate the logical addresses specified in the read command to the physical addresses indicating the location of the data. The controller 123 then reads the requested data from the NVM memory location 112 specified by the physical addresses by sensing the data using the sense amplifiers 124 and storing them in data latches 126 until the read data is returned to the host 104 via the host interface 106.

Figure 3:
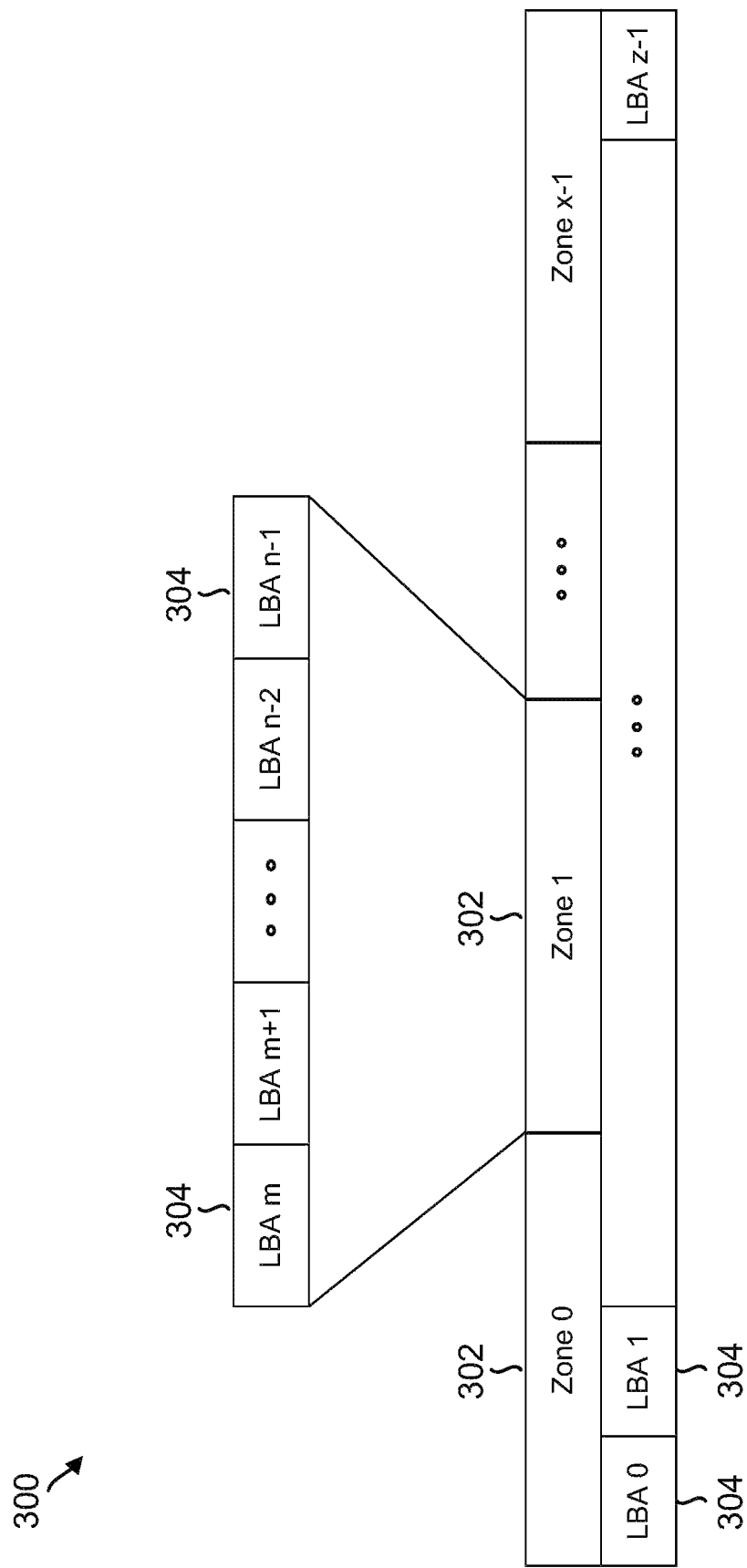
FIG. 3 is a conceptual diagram illustrating an example of zones in the storage device of FIG. 1.

FIG. 3 illustrates a conceptual diagram 300 of an example of zones 302. Each zone 302 is fixed in size and includes a contiguous range of sequential logical addresses 304 in the NVM 110. For instance as illustrated, the NVM 110, 201 may include a total of z LBAs that are divided into x zones, with each zone including a range of n-m sequential LBAs, where z represents the total number of sectors in flash memory, x represents the number of zones, m represents a first LBA in a zone, and n-1 represents a last LBA in the same zone. Each zone may be separately used by the host for storing data associated with one or more applications run by the host. The controller 123 may calculate the number of zones, and thus determine the different ranges of sequential logical addresses 304 in the various zones, based on a fixed zone size and the capacity of storage device 102. For example, if the capacity of the storage device is 8 TB and the fixed zone size is 1 GB, the controller 123 may determine the number of zones to be 8000 in response to dividing the storage device capacity by the fixed zone size (8 TB/1 GB=8000).

The controller 123 may determine a definition of the zones 302 (e.g. groups of logical addresses 304) in the storage device 102. For example, the controller 123 may determine that one group of LBAs, or logical block, is associated with a first zone, that another group of LBAs, or logical block, is associated with a second zone, and so forth. The controller 123 may then map each logical block to one or more physical blocks in the NVM 110. For instance, the controller 123 may map the LBAs associated with the first zone to a first superblock (e.g., one or more of the NVM memory locations 112), the LBAs associated with the second zone to a second superblock (e.g., a different one or more of the NVM memory locations 112), and so forth. The controller 123 may then write and read data 119 in the physical block(s) associated with the zones 302. For example, when writing data to a zone, the controller 123 may create associated L2P entries for that zone data in the L2P mapping table 120, 205 in volatile memory 118, and the data associated with respective logical addresses may be written wherever available in one or more superblocks associated with the zone.

Typically in ZNS, host data (e.g., data 119, 202) is sequentially written to a zone. For example, whenever the host 104 issues a zone write command in which it sends the controller 123 a logical page of data to be written to the NVM 110, 201 at a given logical address, the controller 123 moves a write pointer to the next logical address in the zone 302, and the host 104 is expected to send data for that next logical page when issuing a subsequent zone write command. If the host does not follow this sequence (e.g., if the next write command from the host includes a logical address which is out of order in the sequence, such as a same logical address in an attempted data overwrite), the controller 123 may issue an error and abort the zone write. For instance, referring to FIG. 3, if the host 104 initially writes data in LBA 0 of zone 0 and subsequently sends a write to command to overwrite data in LBA 0 of zone 0, the controller 123 may generate an error since it did not receive a command to write in expected LBA 1. As a result, host 104 generally may not overwrite sequential data at a given logical address in a zone until after the zone is fully written.

However, ZNS may be extended to support data overwrites in a zone within a zone random write area (ZRWA) associated with that zone. In one possible application of ZRWA, the controller 123 may initially store data overwrites for respective zones in volatile memory 118 (e.g., in SRAM), and the controller may later flush these data overwrites from the volatile memory 118 to the NVM 110, 201 in response to a commit operation. However, storage devices generally have limited amounts of volatile memory 118, and thus this approach may not be sufficient to handle the potentially large volume of data overwrites which the controller 123 may receive for various zones. Accordingly, in another application of ZRWA, rather than holding these data overwrites in volatile memory 118, the controller 123 may instead write the data overwrites for respective zones directly in the NVM 110, 201. For example, in addition to writing valid data for a zone 302 in the NVM 110, 201 to a superblock respectively allocated for that zone, the controller 123 may also write data overwrites for the zone 302 and other zones to a default superblock allocated for this purpose in the NVM 110, 201. This approach may reduce the costs that otherwise would have been incurred by use of SRAM for ZRWA.

Figure 4:
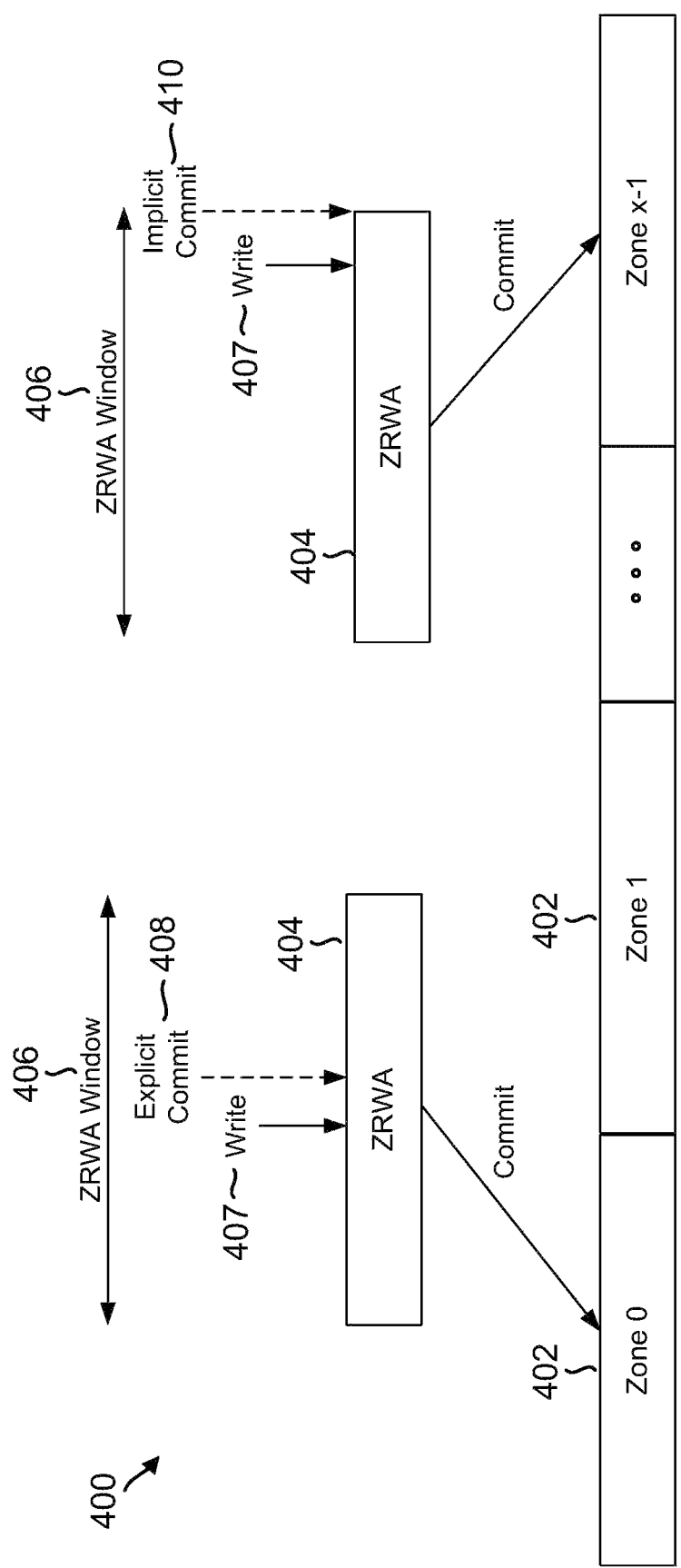
FIG. 4 is a conceptual diagram illustrating an example of a zone random write area (ZRWA) associated with respective zones in the storage device of FIG. 1.

FIG. 4 illustrates a conceptual diagram 400 of an example of zones 402 respectively associated with a ZRWA 404. Initially, the host 104 may send the controller 123 a zone open command to open a zone 402 in a ZRWA mode, and this mode may remain associated with the zone 402 until the zone is finished. For a zone 402 opened in a ZRWA mode, the controller 123 may define a ZRWA window 406 of a predefined region size (e.g., 1 MB) including a sub-range of logical addresses in the zone which the controller 123 may expose to the host 104 for overwrites. In response to a commit operation from either the host 104 or the controller 123, the controller may move the ZRWA window 406 to a next sub-range of logical addresses in the zone 402. As an example, when the host 104 issues a zone write command including a logical page of sequential or random data to a zone 402 supporting a ZRWA 404, the controller 123 may initially store that logical page in a superblock allocated for initial writes to that zone in the NVM 110, 201, and the controller 123 may move a write pointer 407 to the next logical address in the zone 402 within the ZRWA window 406. The controller may also create an associated L2P entry 206 for that initially written zone data in the L2P mapping table 120, 205. If the host 104 issues a zone write command indicating a same logical address as a previously issued zone write command (e.g., a data overwrite) within the ZRWA window 406, then rather than aborting the write command as previously described, the controller 123 may store that next logical page in a default superblock allocated for overwrites to multiple zones in non-volatile memory. The controller 123 may similarly create an associated L2P entry 206 for that overwritten zone data in the L2P mapping table 120, 205.

On the other hand, if the host 104 issues a zone write command indicating a next logical address in the sequence corresponding to the current location of the write pointer 407, the controller 123 may store that next logical page in the superblock allocated for initial writes to that zone 402 and again move the write pointer 407 to the next logical address in the zone within the ZRWA window 406. Data may thus continue to be written or overwritten, L2P entries 206 created, and the write pointer 407 moved within the ZRWA window 406 until either the host 104 issues an explicit commit command 408, or until the ZRWA window 406 becomes full (e.g., the entire sub-range of logical addresses in the ZRWA window have been written, triggering an implicit commit command 410 by the controller 123). In response to the commit operation, the controller 123 may move the ZRWA window 406 to the next sub-range of logical addresses in the zone 402 (e.g., a subsequent 1 MB, predefined region size) beginning after the last committed logical address (e.g., beginning at the current position of the write pointer), and data writes or overwrites within the new ZRWA window may proceed in a similar manner as previously described. Similarly, the controller 123 may continue to create associated L2P entries for that zone data in the L2P mapping table 120, 205.

However, if the controller 123 stores data overwrites for a zone in a superblock in the NVM 110, 201 (e.g., in a ZRWA mode), such storage may complicate the ZNS practice of mapping individual superblocks respectively to individual zones. A superblock refers to a logical block which includes (e.g., is mapped to) multiple physical blocks respectively in different memory dies of the storage device 102. Generally, in storage devices applying ZNS, the controller 123 allocates a single superblock that is sized to store the same amount of data as an individual zone. For example, if a zone stores X MB of data, the superblock is allocated from physical blocks across different memory dies which in total together store X MB of data. Thus, if data overwrites are not supported for a zone (e.g., if a zone 302, 402 is not opened in a ZRWA mode and thus only sequential data writes are allowed), the individual superblock may be sufficient in of itself to store the data of that zone. However, if data overwrites in non-volatile memory are supported for a zone (e.g., if the zone 302, 402 is opened in a ZRWA mode), an individual superblock may no longer be sufficient in itself to store the zone data, since the superblock may include invalid data due to these data overwrites and therefore become fully programmed before the zone is fully written. As a result, the controller may end up writing these data overwrites to at least one default, overprovisioned superblock in the NVM 110, 201 that is allocated for this purpose, but in contrast to the individual superblocks which respectively store data associated with individual zones, these overprovisioned superblock(s) may store data overwrites for multiple zones. For example, referring to FIG. 4, if a superblock for zone 0 becomes full with valid and invalid data for zone 0, and if a superblock for zone 1 likewise becomes full with valid and invalid data for zone 1, the controller may write data overwrites for zone 0 and data overwrites for zone 1 in a same, overprovisioned superblock allocated for this purpose in the NVM 110, 201. As a result of this overprovisioning, the write amplification factor (WAF) of the storage device 102 may be significantly impacted.

To address this complication in ZNS devices, the controller 123 may apply a zone-based garbage collection process (e.g., a reclamation or recycling process for a zone) in which the controller 123 obtains valid zone data from a superblock associated with that zone, as well as the overwritten zone data in the overprovisioned superblock(s) associated with multiple zones, and consolidates or compacts this zone data together into a single superblock for that zone. To achieve this result, the controller 123 may obtain a zone identifier, and the controller 123 (e.g., a data processor or hardware accelerator of the controller) may use this zone identifier to identify the L2P entries associated with the logical addresses for the zone. From these L2P entries, the controller 123 may identify the physical addresses associated with the zone, and based on these physical addresses, the controller 123 may identify the logical addresses of the superblock including initially written, sequential data for that zone and of the overprovisioned superblock(s) including data overwrites for that zone. The controller 123 may then add the superblocks associated with these logical superblock addresses to a list of superblocks for memory recycling, and the controller 123 may perform the garbage collection for the zone individually using each superblock in the list.

For instance, when performing garbage collection for a given zone, the controller 123 may read the zone data stored in a respective superblock in the list (i.e., a source superblock or a recycle reader superblock), and the controller may recycle this zone data from the respective superblock into a single superblock (i.e., a destination superblock or recycle writer superblock). The controller 123 may repeat this process for each superblock associated with the given zone (e.g., in a loop) by replacing each source superblock that has been recycled with another superblock in the list, until the zone data from every source superblock in the list has been transferred to the destination superblock. Thus, a respective zone's valid data may be consolidated into a destination superblock from at least two source superblocks, including a superblock storing the initial sequentially written data for the respective zone (the original superblock before overwrites), and at least one other overprovisioned superblock storing the subsequently overwritten data for that respective zone and other zones. There may be more than one overprovisioned superblock depending on the amount of data overwrites that have occurred for the various zones. Moreover, to ensure that the controller 123 transfers only the respective zone's data in the overprovisioned superblock during the garbage collection process (e.g., the data overwrites for zone 0 but not the data overwrites for zone 1), the controller may utilize a manifest associated with the superblock. This manifest may be, for example, stored metadata in the superblock indicating logical pages or other information (e.g., in the header of a physical page, etc.), which the controller may use to determine the correct zone data to transfer and which zone data to skip in the garbage collection process. At the end of the garbage collection process, a consolidated superblock with all the valid zone data (including the overwrite data) may be formed.

The controller 123 may form superblocks in one of multiple sub-drives of the storage device 102. Here, a sub-drive refers to a logical group or combination of superblocks. The controller may assign superblocks to one of two sub-drives, referred to throughout this disclosure as sub-drive 0 and sub-drive 1, depending on the state of a superblock individually associated with a zone. For instance, when the controller initially writes data to a zone, the controller may form and assign a superblock for that zone to sub-drive 1, and the controller may write this data as well as subsequent host data to the superblock in sequential order of logical addresses associated with the zone. In response to zone write commands respectively for these other zones, the controller may similarly form and assign individual superblocks respectively for these other zones, thereby creating a one-to-one mapping of superblocks to zones. Later on, if the controller receives a command to overwrite data in a respective zone (e.g., a zone write command including a previously written logical address for that zone), the controller may form and assign a different superblock to sub-drive 0, and the controller may write this data overwrite to this superblock for the respective zone, as well as subsequent data overwrites for this zone and other zones to this same superblock. Similarly, if a superblock associated with a respective zone in sub-drive 1 is fully written with valid and invalid data (e.g., due to data overwrites) but the controller subsequently receives a write command for this zone from the host, the controller may likewise write this sequential data to the superblock in sub-drive 0. As a result, the controller may write data for a respective zone into a superblock that is specifically associated with that zone in sub-drive 1, as well as store overwritten or initially written data for that respective zone into an overprovisioned superblock which may store data for multiple zones in sub-drive 0.

Thus, sub-drive 1 may have 0% overprovisioning, while sub-drive 0 may have 100% overprovisioning, for zone data in a ZNS. For instance, in sub-drive 1, the controller may form only one superblock for a respective zone (there is a strict one-to-one mapping between superblocks and zones in sub-drive 1), and therefore if a superblock becomes full due to invalid data from data overwrites before the associated zone is fully written, the controller may not write valid data to that zone in another superblock in sub-drive 1. Instead, the controller may write this valid data to superblock(s) in sub-drive 0, including data overwrites and initially written data after the superblock in sub-drive 1 is full. In contrast, the controller may not write initial zone data to sub-drive 0 (as opposed to data overwrites) if a superblock associated with that zone in sub-drive 1 is not fully written. Thus, sub-drive 1 may be considered to not include any overprovisioning for zone data, while sub-drive 0 may be considered to have only overprovisioning for zone data (i.e., the controller may write to a superblock in sub-drive 0 whenever there is an overflow of zone data in a superblock in sub-drive 1). The controller may write such overflow data for multiple zones to a same superblock in sub-drive 0.

Accordingly, the controller 123 may perform zone-based garbage collection (e.g., a recycle write or GC sweep) to consolidate zone data stored in different sub-drives of the NVM 110, 201. When determining whether or not to initiate a zone-based garbage collection for any zone, the controller 123 may maintain a total number of data overwrites which have been written to the overprovisioned blocks of the storage device 102 in sub-drive 0, and the controller 123 may determine if an amount of memory occupied in total by these data overwrites in sub-drive 0 exceeds a certain threshold or percentage of the total capacity of the NVM 110, 201 including sub-drive 0 and sub-drive 1 (e.g., 3-4% or other threshold percentage). In such case, the controller may perform the GC sweep for a respective zone. Thus, the threshold may serve as the trigger point for the GC sweep.

Additionally, when determining which zone to recycle in sub-drive 1 (e.g., where the controller may store zone-compacted superblocks or initially written zone data), the controller may identify which superblock in sub-drive 1 has the least valid page count (VPC) or otherwise the least amount of valid zone data (the least validity), determine the zone that is associated with this superblock as a victim zone, and perform the aforementioned recycle write process for this victim zone. For instance, after the controller has written sequential data and overwritten data to various zones (but has not performed zone-based garbage collection yet for these various zones), the superblocks individually associated with these respective zones in sub-drive 1 may include different numbers of invalid pages depending on the amount of data overwrites which have occurred for the respective zones. Accordingly, to maximize the amount of reclaim for a zone that may occur from the zone-based garbage collection, the controller may select as the target zone for the GC sweep whichever zone has the least validity (e.g., the most amount of data overwrites). The controller may likewise perform this zone-based garbage collection for other respective zones (e.g., in ascending order of VPCs or otherwise in order from least to most validity) until the amount of memory occupied in total by these data overwrites falls below the aforementioned threshold percentage (e.g., down to 2%). At this point, the trigger condition may no longer be met for a GC sweep, and the zone-based garbage collection may consequently cease.

Figure 5:
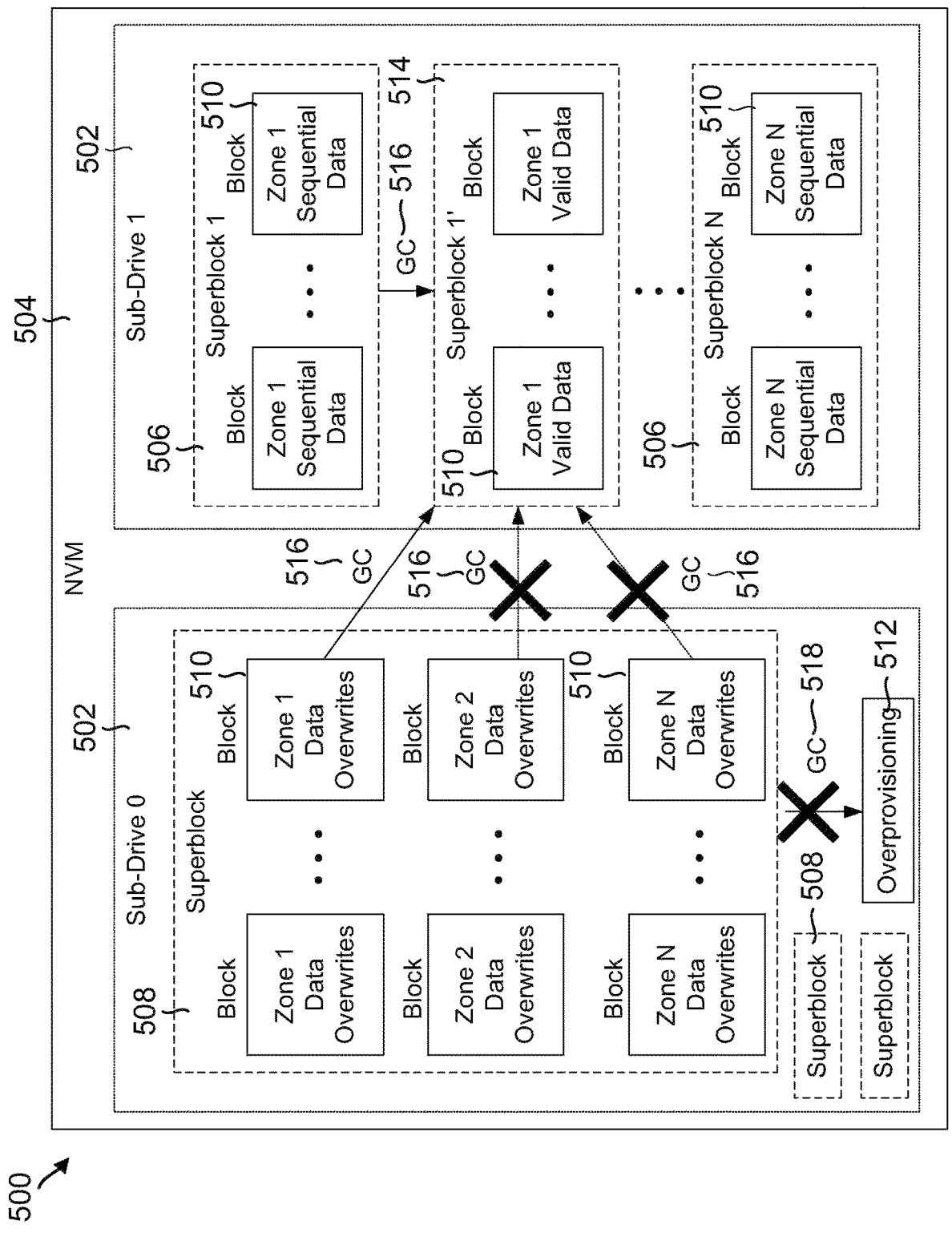
FIG. 5 is a conceptual diagram illustrating an example of zone-based garbage collection in superblocks allocated in different sub-drives of a non-volatile memory in the storage device of FIG. 1.

FIG. 5 illustrates an example 500 of a zone-based garbage collection (GC sweep) performed in superblocks allocated in different sub-drives 502 of NVM 504. In this example, sub-drive 1 may include superblocks 506 respectively associated with different zones, while sub-drive 0 may include superblock(s) 508 including data overwrites of multiple zones. Each superblock 506 in sub-drive 1 may include a plurality of blocks 510 that store data at different logical addresses in a single zone. For example, where NVM 504 includes N zones, sub-drive 1 may include N superblocks, with each superblock including physical blocks that store initially written, sequential data for a single zone (e.g., in a sequential order of logical addresses for the respective zone). Superblock(s) 508 in sub-drive 0, on the other hand, may respectively include blocks 510 that store data at different logical addresses in multiple zones. For example, where NVM 504 includes N zones, sub-drive 0 may include a superblock including physical blocks that store overwritten data in up to N zones (e.g., data overflowed from sub-drive 1). Sub-drive 0 may also include overprovisioning 512 (e.g., one or more additional superblock(s)) that may likewise store data overwrites for multiple zones (e.g., if superblock(s) 508 becomes full). Additionally, the NVM 504 may include a free superblock 514 (e.g., an N+1$^{th}$ superblock), which may be left available and unallocated to a zone until the controller designates this free superblock as a destination superblock for a target zone in a zone-based GC. For instance, in the example of FIG. 5, the controller may determine to perform a GC 516 of zone 1 using superblock 1 as a source superblock, and the controller may allocate the free superblock 514 as a destination superblock for this GC 516 of zone 1 (referenced as superblock 1' in FIG. 5) in sub-drive 1.

To perform zone-based GC, in one example, the controller 123 may determine which of the N superblocks in sub-drive 1 has the least amount of validity (e.g., the lowest VPC), and it applies that superblock 506 for the GC sweep. For instance, in the example of FIG. 5 where NVM 504 includes N zones, the controller 123 may determine that superblock 1 (associated with zone 1) has 94% validity (e.g., 94 valid pages out of every 100 pages), while the other N-1 superblocks in sub-drive 1 have 95% or higher validity, and therefore the controller may determine to apply a GC sweep for zone 1. This process in which the controller selects the zone or superblock associated with the least validity for the GC sweep, is referred to throughout this disclosure as victim selection (or victim zone selection). Through victim selection, the controller may select whichever zone has the least valid data in sub-drive 1 and therefore the most valid data in sub-drive 0, and thus the controller may free up or reclaim whichever zone occupies the most space in sub-drive 0 during a GC sweep. For instance, if superblock 1 has the least validity out of all the superblocks in sub-drive 1 (e.g., 94% validity), then the data for zone 1 in the overprovisioning superblock in sub-drive 0 may include the largest amount of valid data available for zone-based GC out of all the zones (e.g., 6 valid pages out of every 100 pages, which is here the maximum number of valid pages that may be reclaimed in response to a GC sweep of a single zone). Thus, in the example of FIG. 5, the controller may select zone 1 as the victim zone, since applying GC 516 for this zone would result in the most amount of memory in superblock 508 being freed or reclaimed for later use (compared to applying GC for other zones).

However, before the controller 123 even performs victim selection to determine a particular zone for a zone-based GC, the controller may determine whether a trigger for a GC sweep in general (for any zone) has occurred. For example, the controller may determine whether the total amount of memory occupied by data stored in superblock(s) 508 of sub-drive 0 exceeds a threshold percentage of the total available physical capacity of the NVM 110, 201, 504. For instance, referring to the example of FIG. 5, the controller may identify a total amount of memory currently used by zone data in sub-drive 0, including the zone data stored in blocks 510 of superblock 508 for all of zones 1-N, and any other zone data that may be stored in overprovisioning 512 (e.g., other superblock(s) including zone data in sub-drive 0). The controller may then determine whether this total amount of memory used in sub-drive 0 exceeds a configured threshold percentage (e.g., 3% or other percentage) of the total memory capacity combined in sub-drive 0 and sub-drive 1, in which case the controller may trigger a GC sweep and identify a victim zone. For example, if a total capacity of NVM 504 including both its sub-drives is 100 GB, then if the controller determines that the total amount of memory used by valid zone data in sub-drive 0 is at least 3 GB, the controller may determine to perform a zone-based GC for whichever zone currently has the least VPC of all the zones in sub-drive 1. For instance, in the example of FIG. 5, the controller may perform GC 516 for zone 1 in response to determining the general GC sweep trigger has been met and further in response to determining that zone 1 has the least validity.

The GC sweep is different than non-zone-based GC, such as GC 518 in the example of FIG. 5. For instance, when the controller performs a GC 518 of superblock 508 in sub-drive 0, the controller generally compacts the valid data of the superblock 508 in the overprovisioning 512 (e.g., in a destination superblock in sub-drive 0), and the controller may reclaim the source superblock in sub-drive 0 for subsequent zone data usage. This compaction is zone-independent, since the controller may transfer (read and write) valid data associated with multiple zones in the superblock 508 into the same destination superblock in sub-drive 0. However, if insufficient overprovisioning exists for the compaction, the controller may not perform the GC 518. For instance, in the example of FIG. 5, controller 123 may not perform GC 518 within sub-drive 0 if insufficient overprovisioning exists, which may be indicated by the occurrence of the general GC sweep trigger. Therefore, to address this situation of insufficient overprovisioning, the controller may perform zone-based GC or a GC sweep such as GC 516, in which the controller compacts the valid data of superblock 508 in the superblock 506 associated with a victim zone in sub-drive 1. This compaction is zone-dependent, since the controller may refrain from transferring (reading and writing) valid data associated with other zones than the victim zone in the superblock 508 to the free superblock 514 or destination superblock in sub-drive 1.

Therefore, the general GC sweep trigger allows the controller to determine whether or not sufficient overprovisioning exists for GC 518 in sub-drive 0, and thus whether the controller may perform GC 518 (a non-zone-based GC remaining within the same sub-drive) to reclaim memory in superblock 508, or whether the controller may perform GC 516 (a zone-based GC between sub-drives) to reclaim memory in superblock 508. If insufficient overprovisioning exists for GC 518 in sub-drive 0, the controller may be triggered to perform the GC 516. For example, NVM 504 may typically include a limited number of superblocks in sub-drive 0, so the amount of data overwrites the sub-drive 0 may typically tolerate may be very small (e.g., 2% of the total capacity of the NVM 504 including sub-drive 0 and sub-drive 1). This tolerance level corresponds to the threshold percentage the controller may consider when determining whether the trigger has occurred, and thus the controller may set the threshold percentage based on the amount of overprovisioning available in sub-drive 0.

For instance, in one example, assume that the controller 123 has allocated 4% of the total capacity of the NVM 504 for data overwrites in sub-drive 0 (including 2% of the capacity in superblock 508 and a matching 2% of the capacity in overprovisioning 512). In such case, even if the amount of data overwrites completely fills the superblock 508 (the 2% capacity), the 2% overprovisioning would still be sufficient to accommodate GC 518 since the 4% total capacity has not been exceeded. Thus, non-zone-based GC may be performed as long as no more than this 2% capacity is used to store data overwrites in superblock 508. In other words, the controller may perform non-zone-based GC to reclaim memory in superblock 508 so long as the total capacity of the NVM 504 used by the zone data overwrites does not exceed the tolerance level or threshold percentage (e.g., 2%) of the storage device. In such case, no victim zone selection may be performed for GC 518, since in non-zone-based GC, all the zone data may be compacted into the same destination superblock in overprovisioning 512.

However, if the total amount of data overwrites exceeds this 2% capacity of superblock 508, there may not be enough overprovisioning in sub-drive 0 to accommodate the GC 518 within the same sub-drive (e.g., the 4% total capacity would been exceeded). Thus, the controller may not be able to perform non-zone-based GC in such circumstance. For instance, continuing the 2% capacity example above, if the storage device 102 can only tolerate 2% overwrites for each zone out of 1000 zones respectively occupying 1 GB of memory, then the storage device may only tolerate at most 20 GB of overwrites in sub-drive 0 in total across all 1000 zones. As a result, if more than this amount of data has been written to sub-drive 0, there may not be sufficient capacity left in sub-drive 0 (the remaining 2% overprovisioning) for performing a non-zone-based GC within the same sub-drive 0. Accordingly, in such circumstance, the controller may instead determine to perform GC 516 from sub-drive 0 to sub-drive 1 in order to reclaim the memory in superblock 508. In other words, if the total capacity of the NVM 504 used by the data overwrites ends up exceeding the tolerance level or threshold percentage (e.g., 3% or more), the controller may be triggered to perform the GC 516. Moreover, since this GC is between a superblock including multiple zone data in sub-drive 0 and a superblock including single zone data in sub-drive 1, the controller may not perform a zone-independent GC as it might have before when the threshold percentage had not yet been exceeded. Instead, the controller may determine to perform a zone-dependent GC (the GC sweep) to recycle zone data from a single zone such as described above, for example, using victim selection for maximal reclaim efficiency.

Thus, in response to the GC sweep trigger and the victim zone selection of zone 1, the controller may transfer (i.e., read and write) zone 1 sequential data from source superblock 1 in sub-drive 1, and zone 1 data overwrites in the superblock 508 in sub-drive 0, to destination superblock 1' in sub-drive 1. During GC 516, the controller may consolidate the valid data for zone 1 in superblock 1 of sub-drive 1 with the valid data for zone 1 in the overprovisioned superblock of sub-drive 0, while leaving the invalid data for zone 1 remaining in superblock 1 of sub-drive 1. For example, the controller may determine from the L2P mapping table 120, 205 in volatile memory 118 the logical addresses of the superblocks in sub-drives 0 and 1 that include data for zone 1, and the controller may read the zone 1 data from these superblocks and write the zone 1 data to a different superblock individually associated with the zone in sub-drive 1. Moreover, during GC 516 (the zone-based GC), the controller may refrain from transferring (i.e., reading and writing) valid data of other zones from superblock 508 in sub-drive 0 to destination superblock 1' in sub-drive 1, so that the destination superblock for the GC sweep may only include valid data of the victim zone (zone 1 in this example). Thus, in the illustrated example of FIG. 5, the controller may refrain from transferring zone 2 data up to and including zone N data to free superblock 514 when performing GC 516 on zone 1. The controller may subsequently erase the blocks of superblock 1 in sub-drive 1 and later maintain this superblock as the new, free superblock 514 until the controller later designates this superblock as a new destination superblock for a target zone in a subsequent GC sweep.

Figure 6:
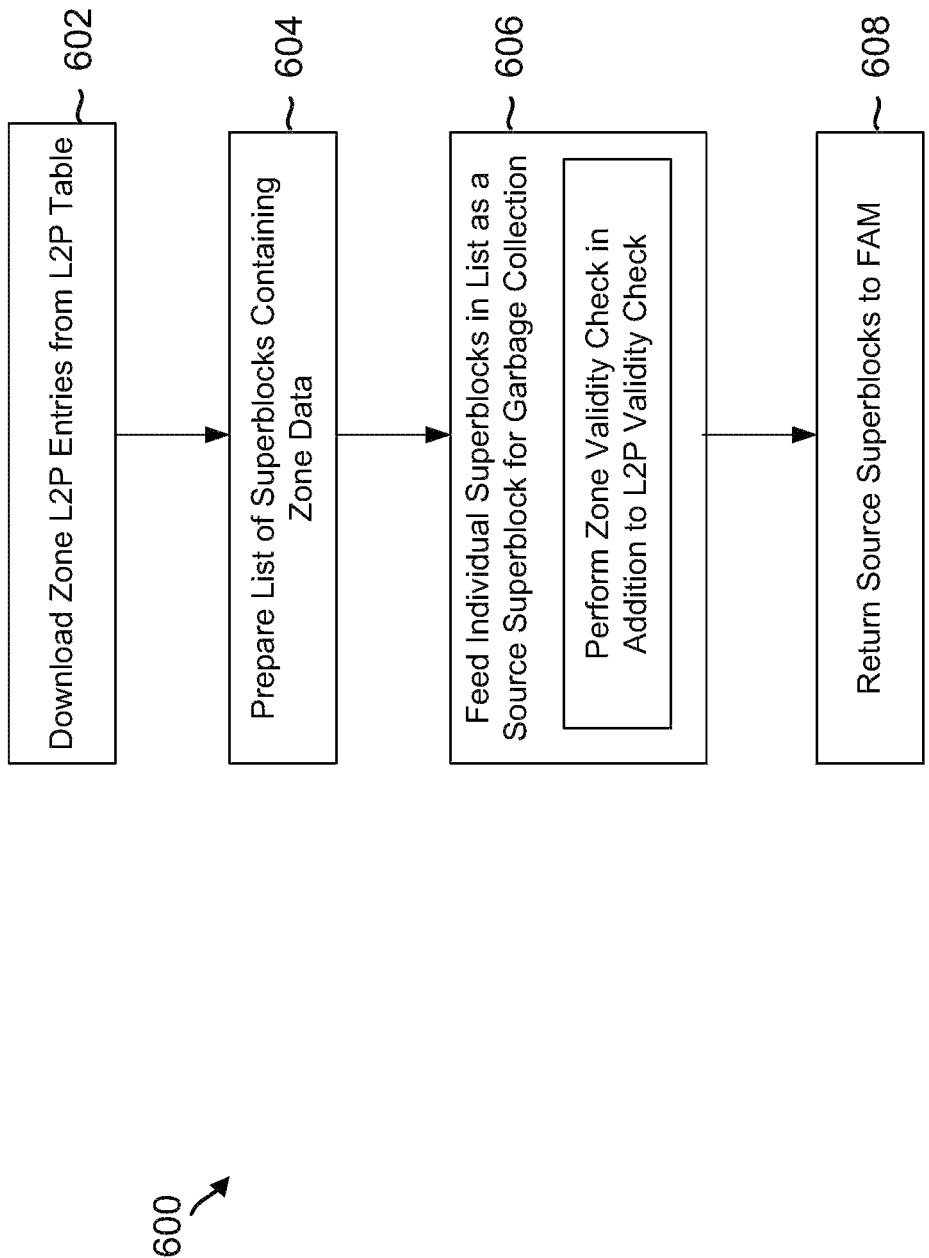
FIG. 6 is a flow chart illustrating an example of a method for performing zone-based garbage collection, as performed by the storage device of FIG. 1.

FIG. 6 illustrates an example flow chart 600 of a method for performing zone-based GC. For example, the method can be carried out in a storage device 102 such as the one illustrated in FIG. 1. Each of the steps in the flow chart can be controlled using the controller as described below (e.g. controller 123), by a component or module of the controller, or by some other suitable means.

As represented by block 602, the controller may download zone L2P entries from an L2P mapping table. For example, during a GC sweep (e.g., GC 516), the controller may access a mapping of zone IDs to logical ranges (e.g., the ZNS), and the controller may identify the logical range for a zone ID selected for the GC sweep. In one example, the zone ID may correspond to a victim zone having the lowest VPC out of all other zones, and the controller may select this zone ID after the GC sweep trigger occurs (e.g., based on the total capacity of the NVM 110, 201 used for zone data overwrites). Alternatively, the controller may select a different zone ID than a victim zone for the GC sweep, such as an arbitrary zone. The controller (e.g., a data processor component of the controller) may fetch the L2P entries associated with the zone corresponding to the zone ID from the L2P mapping table 120, 205, for example, entries 206 including logical addresses 304 associated with the zone 302, 402 selected for the GC sweep.

As represented by block 604, the controller may prepare a list of superblocks containing zone data. For example, after fetching the L2P entries (e.g., entries 206), the controller may identify the physical addresses 208 of the blocks 510 storing data associated with the victim zone from the L2P mapping table 120, 205. The controller may then determine the superblocks 506, 508 including the blocks 510 associated with these physical addresses 208. For example, the controller may maintain a mapping of superblocks 506, 508 to the zones 302, 402, the logical addresses 304 associated with the zones 302, 402, and/or the physical addresses 208 of blocks 510 associated with these logical addresses 304, separate from L2P mapping table 120, 205, and the controller may determine the logical identifiers of these superblocks 506, 508 from this superblock mapping table. After obtaining the superblock identifiers, the controller may add these the identifiers of the selected zone's superblocks to a list or other data structure of source superblocks for the GC sweep (e.g., GC 516).

As represented by block 606, the controller may feed individual superblocks in the list as a source superblock for garbage collection. For example, after adding the identifiers of the selected zone's superblocks (superblocks 506, 508) to a list or other data structure of source superblocks for the GC sweep (e.g., GC 516), the controller may perform the zone-based GC. During the GC, the controller (e.g., a recycle read module of the controller) may obtain the source superblock ID next in the list, and obtain the fetched, physical addresses 208 associated with that superblock 506, 508 currently being processed in the list. Afterwards, as represented by block 608, the controller may perform a zone validity check in addition to an L2P validity check of the logical addresses associated with these fetched physical addresses. For example, in addition to performing an L2P validity check in which the controller may determine from a manifest (e.g., metadata) for the current superblock the valid logical pages at those fetched physical addresses (e.g., the logical pages storing valid data), the controller further performs a zone validity check in which the controller may determine which of these valid logical pages are specifically associated with the selected zone being reclaimed (e.g., based on comparing the logical pages with a mapping of zones 302, 402 to logical addresses that the controller maintains separate from the L2P mapping table 120, 205). After determining the valid logical pages associated with the selected zone for the GC sweep, the controller (e.g., the recycle reader module of the controller) reads the valid zone data from the current source superblock at those determined logical pages (thus ignoring the logical addresses/physical addresses or zone data outside of the selected zone's LBA range), and the controller (e.g., a recycle write module of the controller) writes this valid zone data into a new destination superblock. For example, referring to GC 516 in FIG. 5, the controller may transfer the zone 1 data from superblock 508 in sub-drive 0 to new superblock 1' in sub-drive 1, while refraining from transferring other zones' data from that superblock in sub-drive 0 to superblock 1' in sub-drive 1.

The controller may similarly repeat the above process for each superblock in the list until the list has been exhausted. For example, again referring to GC 516 in FIG. 5, before or after processing superblock(s) 508 in sub-drive 0, the controller may transfer the zone 1 data from the superblock 506 referenced as superblock 1 in sub-drive 1 to the free superblock 514 referenced as new superblock 1' in sub-drive 1. As a result, superblock 1' in sub-drive 1 may be consolidated with the valid zone 1 data from both sub-drive 1 and sub-drive 0, and any invalid zone 1 data in superblock 1 or the superblock(s) of sub-drive 0 may be subsequently erased and the corresponding memory recycled or reclaimed.

Finally, as represented by block 608, the controller may return the superblocks in the source superblock list to a flash array manager (FAM). The FAM is a module of the controller which may keep a record of the state of all the superblocks (e.g., whether a given superblock is partially written or completely written, to which sub-drive the superblock belongs, the superblock's respective blocks, or other metadata of the superblock). The FAM may be responsible for creating/allocating a superblock, un-forming/un-allocating a superblock, or performing other block management layer functions. If the controller receives a host write command for a superblock, the FAM may provide an empty superblock temporarily to a host writer module of the controller to write to the superblock, after which the host writer module may return the completely written superblock back to the FAM. Similarly, with respect to the GC sweep, after the controller identifies the list of source superblocks for the zone-based GC, the FAM may provide the superblocks in the list to the recycle reader module of the controller for processing the GC 516. After the source superblocks have been processed, the recycle reader module may return these superblocks back to the FAM.

Figure 7:
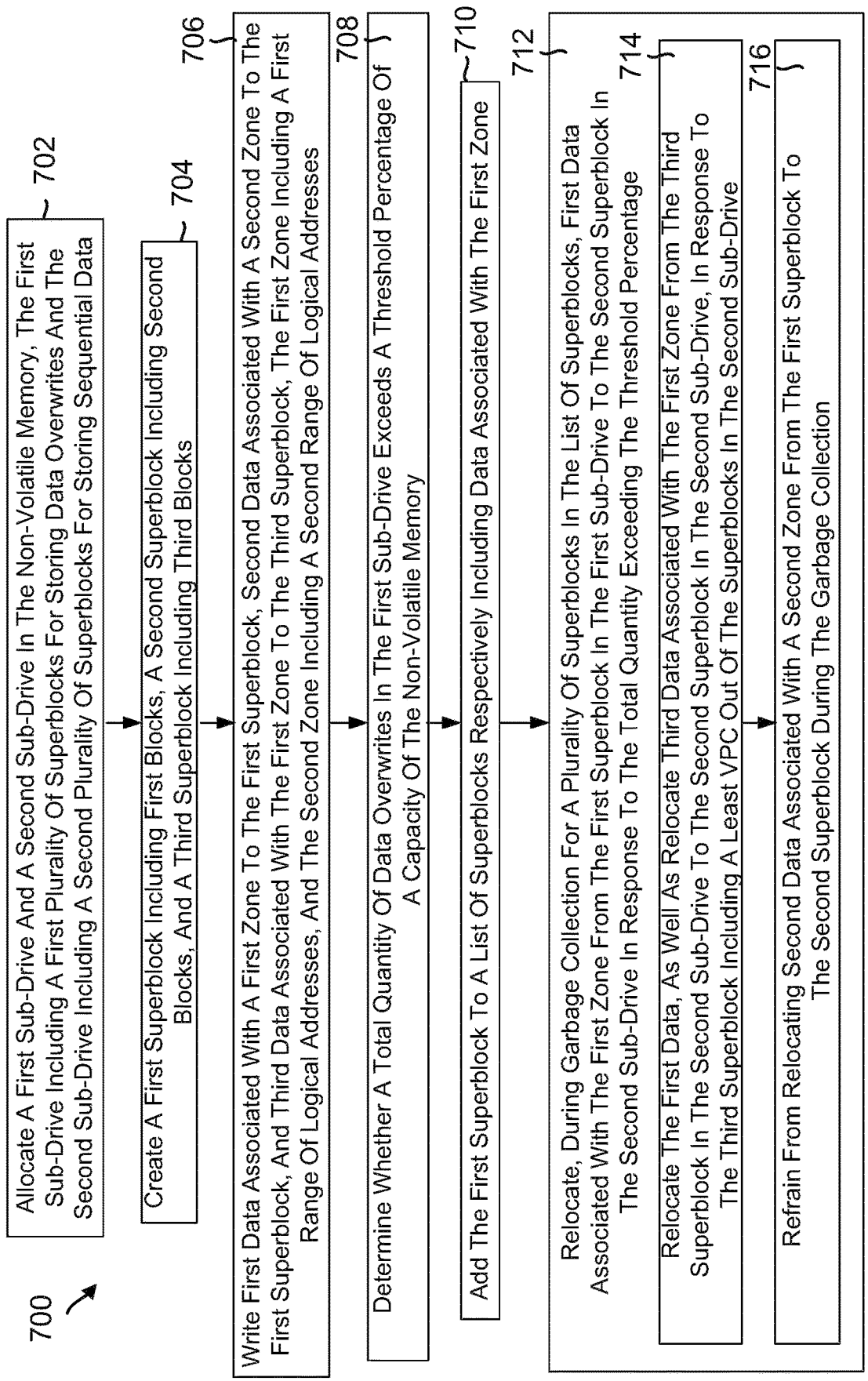
FIG. 7 is a flow chart illustrating an example of another method for performing zone-based garbage collection, as performed by the storage device of FIG. 1.

FIG. 7 illustrates an example flow chart 700 of another method for performing zone-based GC. For example, the method can be carried out in a storage device 102 such as the one illustrated in FIG. 1. Each of the steps in the flow chart can be controlled using the controller as described below (e.g. controller 123), by a component or module of the controller, or by some other suitable means.

As represented by block 702, the controller may allocate a first sub-drive (e.g., sub-drive 0) and a second sub-drive (e.g., sub-drive 1) in non-volatile memory (e.g., NVM 110, 201, 504). The first sub-drive may include a first plurality of superblocks for storing data overwrites (e.g., superblocks 508 in sub-drive 0) and the second sub-drive may include a second plurality of superblocks for storing sequential data (e.g., superblocks 506 in sub-drive 1). The first sub-drive (e.g., sub-drive 0) may also include overprovisioning (e.g., overprovisioning 512) for the first plurality of superblocks (100% overprovisioning), while the second sub-drive (e.g., sub-drive 1) may lack overprovisioning for the second plurality of superblocks (0% overprovisioning).

As represented by block 704, the controller may create a first superblock including first blocks in non-volatile memory (e.g., superblock 508 including blocks 510 in sub-drive 0 of NVM 504), a second superblock including second blocks in non-volatile memory (e.g., free superblock 514 including blocks 510 in sub-drive 1 of NVM 504), and a third superblock including third blocks in non-volatile memory (e.g., superblock 506 including blocks 510 in sub-drive 1 of NVM 504). The first plurality of superblocks in the first sub-drive may include the first superblock (e.g., superblock 508 in sub-drive 0), and the second plurality of superblocks in the second sub-drive may include the second superblock and the third superblock (e.g., superblocks 506, 514 in sub-drive 1).

As represented by block 706, the controller may write first data associated with a first zone to the first superblock (e.g., data 119, 202 associated with zone 1 to superblock 508), second data associated with a second zone to the first superblock (e.g., data 119, 202 associated with zone 2 to superblock 508), and third data associated with the first zone to the third superblock (e.g., data 119, 202 associated with zone 1 to superblock 506). The first zone may include a first range of logical addresses (e.g., logical addresses 304 in zone 1), and the second zone may include a second range of logical addresses different than the first range of logical addresses (e.g., different logical addresses 304 in zone 2). The first data and second data may be data overwrites (e.g., stored in blocks 510 of superblock 508), while the third data may be sequential data (e.g., stored in blocks 510 of superblock 506 such as superblock 1 in FIG. 5).

As represented by block 708, the controller may determine whether a total quantity of data overwrites in the first sub-drive (e.g., sub-drive 0) exceeds a threshold percentage of a capacity of the non-volatile memory (e.g., NVM 110, 201, 504). If this general GC sweep trigger is met, the controller may perform zone-based GC. For instance, referring to the example of FIG. 5, the controller may identify a total amount of memory currently used by zone data in sub-drive 0, including the zone data stored in blocks 510 of superblock 508 for all of zones 1-N, and any other zone data that may be stored in overprovisioning 512 (e.g., other superblock(s) including zone data in sub-drive 0). The controller may then determine whether this total amount of memory used for zone data in sub-drive 0 exceeds a configured threshold percentage (e.g., 3% or other percentage) of the total memory capacity of sub-drive 0 and sub-drive 1 combined, in which case the controller may trigger a GC sweep for a victim zone.

As represented by block 710, the controller may add the first superblock (e.g., superblock 508) to a list (e.g., a data structure) of superblocks respectively including data associated with the first zone (e.g., zone 1). Moreover, the controller may add the third superblock (e.g., superblock 506 referenced as superblock 1) to the list of superblocks respectively including data associated with the first zone. To locate these superblocks to add to the list, the controller may perform the steps described above with respect to blocks 602 and 604 of FIG. 6. For example, the controller may first identify a range of logical addresses associated with the first zone (e.g., logical addresses 304 of zone 1). Then, the controller may obtain, from an L2P mapping table (e.g., L2P mapping table 120, 205), a L2P mapping (e.g., entry 206) of a physical address in the non-volatile memory (e.g., physical address 208) to a logical address in the first range of logical addresses (e.g., logical address 304 of zone 1). Next, the controller may determine the superblocks (e.g., superblocks 506, 508) respectively including the data associated with the first zone (e.g., zone 1) using the L2P mapping (e.g., entry 206). Finally, the controller may add, in response to this determination, the superblocks including the first superblock (e.g., superblock 508) and the third superblock (e.g., superblock 506) to the list of superblocks.

As represented by block 712, the controller may relocate, during garbage collection for a plurality of superblocks in the list of superblocks (e.g., GC 516 for superblocks 506, 508), first data associated with the first zone (e.g., zone 1) from the first superblock in the first sub-drive (e.g., superblock 508 in sub-drive 0) to the second superblock in the second sub-drive (e.g., free superblock 514 in sub-drive 1). Similarly, the controller may relocate third data associated with the first zone (e.g., zone 1) from the third superblock in the second sub-drive (e.g., superblock 1 in sub-drive 1) to the second superblock in the second sub-drive (e.g., free superblock 514 in sub-drive 1). For example, the controller may perform the steps described above with respect to blocks 606 and 608 of FIG. 6. The controller may perform these relocations in response to the total quantity of data overwrites determined at block 708 exceeding the threshold percentage (e.g., in response to determining that the aforementioned, general GC sweep trigger has occurred). Furthermore, as represented by block 714, the controller may relocate the first data and the third data to the second superblock in the second sub-drive during the garbage collection (e.g., to superblock 1' in sub-drive 1 during GC 516) in response to the third superblock (e.g., superblock 1 in sub-drive 1) including a least VPC out of the VPCs of the third superblock and of other superblocks in the second sub-drive (e.g., superblocks 506 in sub-drive 1). This victim zone selection maximizes the efficiency of the GC 516. Moreover, as represented by block 716, the controller may refrain from relocating second data associated with the second zone (e.g., zone 2) from the first superblock (e.g., superblock 508) to the second superblock (e.g., free superblock 514) during the garbage collection (e.g., GC 516).

Figure 8:
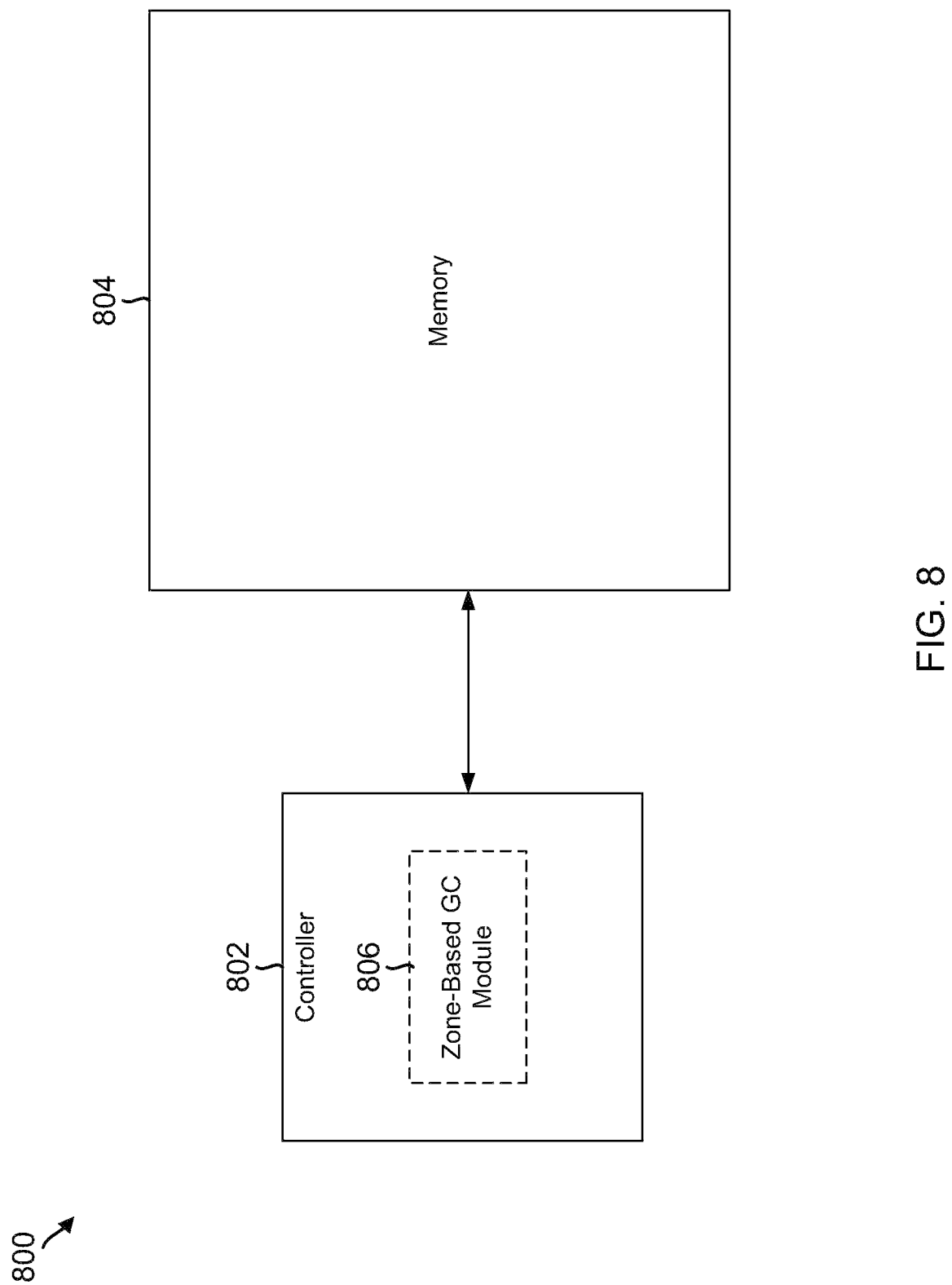
FIG. 8 is a conceptual diagram illustrating an example of a controller that performs zone-based garbage collection in the storage device of FIG. 1.

FIG. 8 is a conceptual diagram illustrating an example 800 of a controller 802 coupled to a memory 804 in a storage device. For example, controller 802 may correspond to controller 123 and memory 804 may correspond to the NVM 110, 201, 504 of the storage device 102 in FIG. 1. The controller may be implemented in software, hardware, or a combination of hardware and software. In one exemplary embodiment, the controller is implemented with several software modules executed on one or more processors, but as those skilled in the art will appreciate, the controller may be implemented in different ways. The skilled artisan will readily understand how best to implement the controller based on the particular design parameters of the system.

In one example, the controller 802 includes a zone-based GC module 806 that may provide a means for creating a first superblock including the first blocks, a second superblock including the second blocks, and a third superblock including the third blocks; a means for allocating a first sub-drive and a second sub-drive in the non-volatile memory, the first sub-drive including a first plurality of superblocks for storing data overwrites and the second sub-drive including a second plurality of superblocks for storing sequential data, the first plurality of superblocks including the first superblock, and the second plurality of superblocks including the second superblock and the third superblock; a means for writing first data associated with a first zone to the first superblock, second data associated with a second zone to the first superblock, and third data associated with the first zone to the third superblock, the first zone including a first range of logical addresses, and the second zone including a second range of logical addresses; a means for relocating, during garbage collection for a plurality of superblocks respectively including data associated with the first zone, the first data from the first superblock and the third data from the third superblock to the second superblock; and a means for refraining from relocating the second data associated with the second zone from the first superblock to the second superblock during the garbage collection. For example, the zone-based GC module 806 may perform the processes described above with respect to FIG. 6 or 7.

Generally, ZNS devices have some level of overwrites which can be accommodated in SRAM (in ZRWA), and once a commit operation occurs, the overwrites are written from the SRAM to NAND (in the NVM). However, caching overwrites in SRAM may lead to a high cost of implementing ZNS with ZRWA. To reduce costs, the controller may write these overwrites to NAND (instead of the SRAM) in a non-ZNS namespace in sub-drive 0, and these overwrites may be moved to a ZNS namespace in sub-drive 1 during reclaim/recycling. In particular, the controller may apply a recycling approach which recycles the data lying in a particular zone's LBA range in response to certain triggers (e.g., a general GC sweep trigger and victim zone selection). For example, the controller may download zone L2P entries from an L2P mapping table using a data processor, prepare a list of superblocks containing the zone data the controller determines to reclaim, feed the source superblocks to a recycle reader module, and then perform a GC via its recycle reader and recycle writer modules including data reads, a L2P validity check, and data writes. Moreover, the controller may also check for zone validity to confirm that the correct zone is being recycled. Thus, one zone may be recycled at a time.

Thus, the controller may relocate data from a first sub-drive or group of logical superblocks to a second sub-drive or group of logical superblocks based on metadata indicating a zone associated with the data being relocated. For instance, the controller may be configured to relocate data from one group of superblocks in one sub-drive to another group of super blocks in another sub-drive based on an indication of a zone associated with that data. In particular, when relocating across sub-drives, the controller may filter out a victim zone's data and create a list of superblocks for recycling which contain this data. For instance, rather than merely selecting an arbitrary superblock to reclaim, the controller may prepare or identify a list of superblocks for recycling, and rather than merely reclaiming all the memory in those superblocks regardless of zones, the controller may filter out memories containing a specific zone's data as the memory in the superblocks to be recycled. While the zone may be selected for recycling arbitrarily, victim zone selection may maximize the amount of space reclaimed in sub-drive 0.

Additionally, since sub-drive 1 has 0% overprovisioning while sub-drive 0 has 100% overprovisioning, overprovisioning in the storage device may be reduced significantly compared to non-ZNS devices (where sub-drives may all have overprovisioning). Thus, since sub-drive 1 does include overprovisioning, the controller may be configured to perform memory claim only for sub-drive 0 for improved GC efficiency. Moreover, if the controller determines that there are more average overwrites per zone then the storage device can tolerate (e.g., 2-3% of the total NVM capacity), the controller may move zone data from sub-drive 0 to sub-drive 1 in a GC sweep to maintain the overprovisioning of sub-drive 0. The low amount of overprovisioning in sub-drive 0 may be reclaimed and thus used more efficiently.

As a result, the storage device may use less SRAM since overwrites may be stored in NAND directly rather than in cache, reducing storage device cost. The controller may write the overwrites to NAND and later compact these overwrites with other data related to a specific zone in a corresponding superblock through the GC sweep. Additionally, the GC sweep allows the storage device to have a reduced WAF as targeted for ZNS devices with certain workloads. As a result of GC sweep, the controller may reclaim space in a ZNS device with reduced overprovisioning and in turn reduced cost.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to all types of storage devices capable of storing data. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
   a non-volatile memory including a plurality of first blocks and a plurality of second blocks; and
   a controller configured to:
      create a first superblock including the first blocks and a second superblock including the second blocks;
      add the first superblock to a list of superblocks respectively including data associated with a first zone;
      relocate, during garbage collection for a plurality of superblocks in the list of superblocks, first data associated with the first zone from the first superblock to the second superblock, the first zone including a first range of logical addresses; and
      refrain from relocating second data associated with a second zone from the first superblock to the second superblock during the garbage collection, the second zone including a second range of logical addresses different than the first range of logical addresses,
      wherein adding the first superblock to the list of superblocks comprises:
         identify a range of logical addresses associated with the first zone;
         obtain, from a logical-to-physical (L2P) mapping table, a L2P mapping of a physical address in the non-volatile memory to a logical address in the first range of logical addresses; and
         determine the plurality of superblocks respectively including the data associated with the first zone using the L2P mapping, wherein the first superblock is one of the plurality of superblocks.

2. The storage device of claim 1, wherein the controller is further configured to:
   allocate a first sub-drive and a second sub-drive in the non-volatile memory, the first sub-drive including a first plurality of superblocks for storing data overwrites and the second sub-drive including a second plurality of superblocks for storing sequential data, the first plurality of superblocks including the first superblock and the second plurality of superblocks including the second superblock.

3. The storage device of claim 2, wherein the controller is further configured to:
   relocate the first data from the first superblock in the first sub-drive to the second superblock in the second sub-drive.

4. The storage device of claim 2, wherein the first sub-drive includes overprovisioning for the first plurality of superblocks and the second sub-drive lacks overprovisioning for the second plurality of superblocks.

5. The storage device of claim 2, wherein the controller is further configured to:
   determine whether a total quantity of the data overwrites in the first sub-drive exceeds a threshold percentage of a capacity of the non-volatile memory; and
   relocate the first data from the first superblock in the first sub-drive to the second superblock in the second sub-drive in response to the total quantity exceeding the threshold percentage.

6. The storage device of claim 2,
   wherein the non-volatile memory further includes a plurality of third blocks; and
   wherein the controller is further configured to:
      create a third superblock including the third blocks, the second plurality of superblocks of the second sub-drive including the third superblock; and
      relocate third data associated with the first zone from the third superblock in the second sub-drive to the second superblock in the second sub-drive during the garbage collection.

7. The storage device of claim 6, wherein the controller is further configured to:
   determine whether a total quantity of the data overwrites in the first sub-drive exceeds a threshold percentage of a capacity of the non-volatile memory; and
   relocate the third data from the third superblock in the second sub-drive to the second superblock in the second sub-drive in response to the total quantity exceeding the threshold percentage.

8. The storage device of claim 7, wherein the controller is further configured to:
   relocate the first data and the third data to the second superblock in the second sub-drive in response to the third superblock including a least valid page count (VPC) out of the VPCs of the third superblock and of other superblocks in the second sub-drive.

9. The storage device of claim 1, wherein the first data and the second data are data overwrites.

10. A storage device, comprising:
    a non-volatile memory including a plurality of first blocks and a plurality of second blocks; and
    a controller configured to:
       create a first superblock including the first blocks and a second superblock including the second blocks;
       write first data associated with a first zone to the first superblock and second data associated with a second zone to the first superblock, the first zone including a first range of logical addresses, and the second zone including a second range of logical addresses;
       add the first superblock to a list of superblocks respectively including data associated with the first zone;
       relocate, during garbage collection for a plurality of superblocks in the list of superblocks, the first data from the first superblock to the second superblock; and
       refrain from relocating the second data from the first superblock to the second superblock during the garbage collection,
       wherein adding the first superblock to the list of superblocks comprises:
          identify a range of logical addresses associated with the first zone;
          obtain, from a logical-to-physical (L2P) mapping table, a L2P mapping of a physical address in the non-volatile memory to a logical address in the first range of logical addresses;
          determine the superblocks respectively including the data associated with the first zone using the L2P mapping; and
          add, in response to the determination, the superblocks including the first superblock to the list of superblocks.

11. The storage device of claim 10, wherein the controller is further configured to:
    allocate a first sub-drive and a second sub-drive in the non-volatile memory, the first sub-drive including a first plurality of superblocks for storing data overwrites and the second sub-drive including a second plurality of superblocks for storing sequential data, the first plurality of superblocks including the first superblock and the second plurality of superblocks including the second superblock; and
    relocate the first data from the first superblock in the first sub-drive to the second superblock in the second sub-drive;
    wherein the first sub-drive includes overprovisioning for the first plurality of superblocks and the second sub-drive lacks overprovisioning for the second plurality of superblocks.

12. The storage device of claim 11,
    wherein the non-volatile memory further includes a plurality of third blocks; and
    wherein the controller is further configured to:
       determine whether a total quantity of the data overwrites in the first sub-drive exceeds a threshold percentage of a capacity of the non-volatile memory; and
       relocate, to the second superblock in the second sub-drive, third data associated with the first zone from a third superblock, the second plurality of superblocks of the second sub-drive including the third superblock, and the third superblock including the third blocks, wherein the third data is relocated in response to the determination and in response to the third superblock including a least valid page count (VPC) out of the VPCs of the third superblock and of other superblocks in the second sub-drive.

13. The storage device of claim 12, wherein the first data and the second data are data overwrites, and the third data is sequential data.

14. A storage device, comprising:
    a non-volatile memory including a plurality of first blocks, a plurality of second blocks, and a plurality of third blocks; and
    a controller configured to:
       create a first superblock including the first blocks, a second superblock including the second blocks, and a third superblock including the third blocks;
       allocate a first sub-drive and a second sub-drive in the non-volatile memory, the first sub-drive including a first plurality of superblocks for storing data overwrites and the second sub-drive including a second plurality of superblocks for storing sequential data, the first plurality of superblocks including the first superblock, and the second plurality of superblocks including the second superblock and the third superblock;
       write first data associated with a first zone to the first superblock, second data associated with a second zone to the first superblock, and third data associated with the first zone to the third superblock, the first zone including a first range of logical addresses, and the second zone including a second range of logical addresses;

relocate, during garbage collection for a plurality of superblocks respectively including data associated with the first zone, the first data from the first superblock and the third data from the third superblock to the second superblock; and refrain from relocating the second data associated with the second zone from the first superblock to the second superblock during the garbage collection.

15. The storage device of claim 14, wherein the controller is further configured to:

identify a range of logical addresses associated with the first zone;

obtain, from a logical-to-physical (L2P) mapping table, a L2P mapping of a physical address in the non-volatile memory to a logical address in the first range of logical addresses;

determine the superblocks respectively including the data associated with the first zone using the L2P mapping; and add, in response to the determination, the superblocks including the first superblock and the third superblock to a list of superblocks respectively including data associated with the first zone, the garbage collection being for the superblocks in the list of superblocks.

16. The storage device of claim 14, wherein the controller is further configured to:

determine whether a total quantity of data overwrites in the first sub-drive exceeds a threshold percentage of a capacity of the non-volatile memory; and relocate, in response to the determination and in response to the third superblock including a least valid page count (VPC) out of the VPCs of the third superblock and of other superblocks in the second sub-drive, the first data in the first sub-drive and the third data in the second sub-drive to the second superblock in the second sub-drive.

17. The storage device of claim 14, wherein the first data and the second data are data overwrites, and the third data is sequential data.

* * * * *